US007231342B2

(12) United States Patent
Edwards et al.

(10) Patent No.: US 7,231,342 B2
(45) Date of Patent: Jun. 12, 2007

(54) METHOD, SYSTEM, AND COMPUTER PROGRAM PRODUCT IN A LOGICALLY PARTITIONED DATA PROCESSING SYSTEM FOR DISPLAYING MESSAGES IN A MANAGEMENT CONSOLE'S NATIVE LANGUAGE

(75) Inventors: Mark Steven Edwards, Austin, TX (US); Ya-Huey Juan, Poughkeepsie, NY (US); Truc Duy Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 937 days.

(21) Appl. No.: 10/339,761

(22) Filed: Jan. 9, 2003

(65) Prior Publication Data

US 2004/0138871 A1    Jul. 15, 2004

(51) Int. Cl.
*G06F 17/28* (2006.01)
(52) U.S. Cl. .......................................... 704/3; 715/703
(58) Field of Classification Search ..................... None
See application file for complete search history.

(56) References Cited

U.S. PATENT DOCUMENTS

| | | | | |
|---|---|---|---|---|
| 4,566,078 A | 1/1986 | Crabtree | ..................... | 364/900 |
| 4,595,980 A | 6/1986 | Innes | ......................... | 364/200 |
| 4,615,002 A | 9/1986 | Innes | ......................... | 364/200 |
| 4,992,950 A | 2/1991 | Francisco | ................... | 364/478 |
| 5,146,587 A * | 9/1992 | Francisco | ................... | 714/57 |
| 5,287,444 A | 2/1994 | Enescu et al. | .............. | 395/148 |
| 5,307,265 A | 4/1994 | Winans | ................... | 364/419.01 |
| 5,428,772 A * | 6/1995 | Merz | ............................. | 707/4 |
| 5,583,761 A * | 12/1996 | Chou | ......................... | 715/536 |
| 5,944,790 A * | 8/1999 | Levy | ......................... | 709/218 |
| 6,138,150 A | 10/2000 | Nichols et al. | ............. | 709/219 |
| 6,338,033 B1 * | 1/2002 | Bourbonnais et al. | ......... | 704/3 |
| 2002/0087915 A1 * | 7/2002 | Perla et al. | ................... | 714/15 |
| 2003/0063113 A1 * | 4/2003 | Andrae | ...................... | 345/700 |

OTHER PUBLICATIONS

Stallman, "EMACS The Extensible, Customizable Self-Documenting Display Editor", Artificial Intelligence Lab, Massachusetts Institute of Technology, pp. 147-156.
IBM Technical Disclosure Bulletin, "Method for Providing National Language Support for Hardware System Consoles", vol. 35, No. 1B, Jun. 1992, pp. 240-241.
IBM Technical Disclosure Bulletin, "Managing Messages", vol. 36, No. 02, Feb. 1993, pp. 305-308.

* cited by examiner

*Primary Examiner*—Donald L. Storm
(74) *Attorney, Agent, or Firm*—Duke W. Yee; Diana R. Gerhardt; Wayne P. Bailey

(57) ABSTRACT

A method, system, and computer program product within a logically partitioned data processing system that includes multiple partitions and a management console are described for displaying messages in a language specified by the console. A language is specified by the management console. The specification is transmitted to each one of the partitions. A message is generated within one of the partitions. The partition then utilizes the specification to select a translation of the message into the language specified by the management console. The translation is then transmitted from the partition to the management console for display by the management console.

24 Claims, 4 Drawing Sheets

100 DATA PROCESSING SYSTEM

METHOD, SYSTEM, AND COMPUTER PROGRAM PRODUCT IN A LOGICALLY PARTITIONED DATA PROCESSING SYSTEM FOR DISPLAYING MESSAGES IN A MANAGEMENT CONSOLE'S NATIVE LANGUAGE

BACKGROUND OF THE INVENTION

1. Technical Field

The present invention relates generally to the field of computer systems and, more specifically, to a method, system, and computer program product in a logically partitioned data processing system that includes a management console for displaying messages in the console's native language regardless of the physical locations of the partitions or console.

2. Description of Related Art

A logical partitioning option (LPAR) within a data processing system (platform) allows multiple copies of a single operating system (OS) or multiple heterogeneous operating systems to be simultaneously run on a single data processing system platform. A partition, within which an operating system image runs, is assigned a non-overlapping subset of the platform's resources. These platform allocable resources include one or more architecturally distinct processors with their interrupt management area, regions of system memory, and input/output (I/O) adapter bus slots. The partition's resources are represented by its own open firmware device tree to the OS image.

Each distinct OS or image of an OS running within the platform is protected from each other such that software errors on one logical partition can not affect the correct operation of any of the other partitions. This is provided by allocating a disjoint set of platform resources to be directly managed by each OS image and by providing mechanisms for ensuring that the various images can not control any resources that have not been allocated to it. Furthermore, software errors in the control of an OS's allocated resources are prevented from affecting the resources of any other image. Thus, each image of the OS (or each different OS) directly controls a distinct set of allocable resources within the platform.

A management console may be utilized as part of the logically partitioned data processing system to manage the various partitions, partitioned hardware, software execution, as well as to perform other management functions such as error handling. Errors are reported from the partitions to the management console and then displayed, via the management console, to a user.

One of the services provided by the management console is to provide serviceability for the system automatically. When an error occurs on a partition, it is delivered to the management console for service. If the same error is being reported from multiple partitions, they are delivered to the management console as separate serviceable events, where they are merged into a single serviceable event. If the management console is being set up for automatic service, the service team is notified about the problem shortly after the error occurs on the partitions.

In some logically partitioned systems, various partitions as well as the management console may be located in different geographical regions. In some cases, the partitions and management console may each be located in different countries. This presents a problem when configuring the system for use according to the local native language.

Also, a system could be shared by several international teams where each team has its own partition set up with its own choice of locale. The administration team could be the host country which wants to set its own locale on the management console. The notification of the errors would be sent to the service team, such as in the U.S. for example, with error descriptions in English.

There is no native language support for error messages that are reported from the partitions to the management console. The error messages delivered from the partitions to the management console are reported in the native language set according to the geographical locale of a partition, and not according to the language of the locale where the management console is located. Thus, for example, if a partition is located in Japan and the management console is located in France, error messages from the partition will be displayed by the management console in Japanese or English. The users in France may have difficulty translating the Japanese error messages.

For partitions, a native language support (NLS) catalog may be bundled with the operating system which then supports various languages. It is not practical, however, to bundle these same catalogs with the management console. For systems where the partitions as well as the management console are located in different countries requiring different language support, multiple different catalogs would have to be supplied with the management console. Coordinating all of these different catalogs would be very complex and error prone.

Further, a user could add software or hardware to a partition at a later time that supplied error messages in a language not supported by the partition's catalog. In this case, even if the management console did have the partition's language catalog, the console would not be able to translate error messages that were generated by the new software or hardware.

Therefore, a need exists for a method, system, and computer program product in a logically partitioned system that includes multiple partitions and a management console that may all be located in different locales for displaying messages in the native language of the geographical location of the console without requiring the console to have a partition's NLS catalog.

SUMMARY OF THE INVENTION

A method, system, and computer program product within a logically partitioned data processing system that includes multiple partitions and a management console are described for displaying messages in a language specified by the console. A language is specified by the management console. The specification of the locale is transmitted to each one of the partitions. The locale specification is then kept on each partition to be used later when an error is reported to the partition from the operating system. A message is generated within one of the partitions. The partition then utilizes the specification to select a translation of the message into the language specified by the management console. The translation is then transmitted from the partition to the management console for display by the management console.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
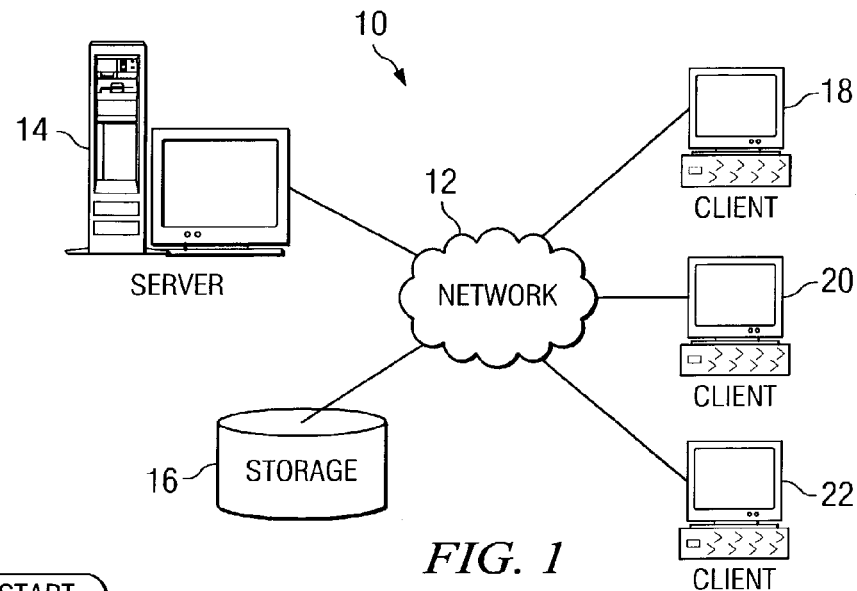
FIG. 1 depicts a pictorial representation of a network of data processing systems in which the present invention may be implemented.

A preferred embodiment of the present invention and its advantages are better understood by referring to the figures, like numerals being used for like and corresponding parts of the accompanying figures.

The present invention is a method, system, and computer program product in a logically partitioned data processing system for displaying messages in a language specified by a management console regardless of the geographical location of the console. The management console and each partition may be physically located in different geographical areas such that a different language is native to the different areas.

The present invention provides a method, system, and product for displaying on the console messages that are generated within a partition. The messages are displayed on the console in a language that is specified by the console regardless of the native language of the geographical location of the partition. Typically, the specified language will be the language that is the native language of the geographical area where the console is located.

A language is first specified by the management console. The specification is then transmitted to each one of the partitions from the console. Messages generated within the partitions will then be displayed on the console in the language that is specified by the console.

When a partition generates a message, such as an error message, the operating system executing within the partition determines which language is specified by a management console. The operating system of the partition then selects a translation of the message into the language specified by the management console. The operating system then transmits the translation of the message from the partition to the management console for display by the console.

In some cases, more than one language will be specified. In these cases, a translation into each one of these languages is transmitted to the console.

The message is typically transmitted to a console via a serviceable event. The serviceable event will include one or more translations stored in the event. In addition, the event will include a version of the message in a default language.

Some systems may include multiple redundant management consoles. In these systems, each console may select its own language(s). In these systems when a message is to be transmitted from a partition, the operating system of the partition prepares an event for transmission. The operating system will prepare one event with two translated messages of the error messages. This event will then be sent to both management console. Each management console may then select the translation that is appropriate for that management console.

Other partitions may be located in a geographical area where a completely different language is used. These partitions will prepare serviceable events according to the languages specified by each console regardless of the physical locations of the partitions.

In this manner, each console may display messages in the native language specified by the console from partitions that are located in different locales that have different native languages. The present invention is accomplished without the need for including native language translation capabilities within a management console. In addition, the partitions do not need to transmit their language catalogs to a management console.

FIG. 1 depicts a pictorial representation of a network of data processing systems in which the present invention may be implemented. Network data processing system 10 is a network of computers in which the present invention may he implemented. Network data processing system 10 contains a network 12, which is the medium used to provide communications links between various devices and computers connected together within network data processing system 10. Network 12 may include connections, such as wire, wireless communication links, or fiber optic cables.

In the depicted example, a server 14 is connected to network 12 along with storage unit 16. In addition, clients 18, 20, and 22 also are connected to network 12. Network 12 may include permanent connections, such as wire or fiber optic cables, or temporary connections made through telephone connections. The communications network 12 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 14 without departing from the scope of the present invention. Moreover, as used herein, communications include those enabled by wired or wireless technology.

Clients 18, 20, and 22 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the depicted example, server 14 provides data, such as boot files, operating system images, and applications to clients 18–22. Clients 18, 20, and 22 are clients to server 14. Network data processing system 10 may include additional servers, clients, and other devices not shown. In the depicted example, network data processing system 10 is the Internet with network 12 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 10 also may be implemented as a number of different types of networks, such as for example, an intranet, a local area network (LAN), or a wide area network (WAN). FIG. 1 is intended as an example, and not as an architectural limitation for the present invention.

Figure 2:
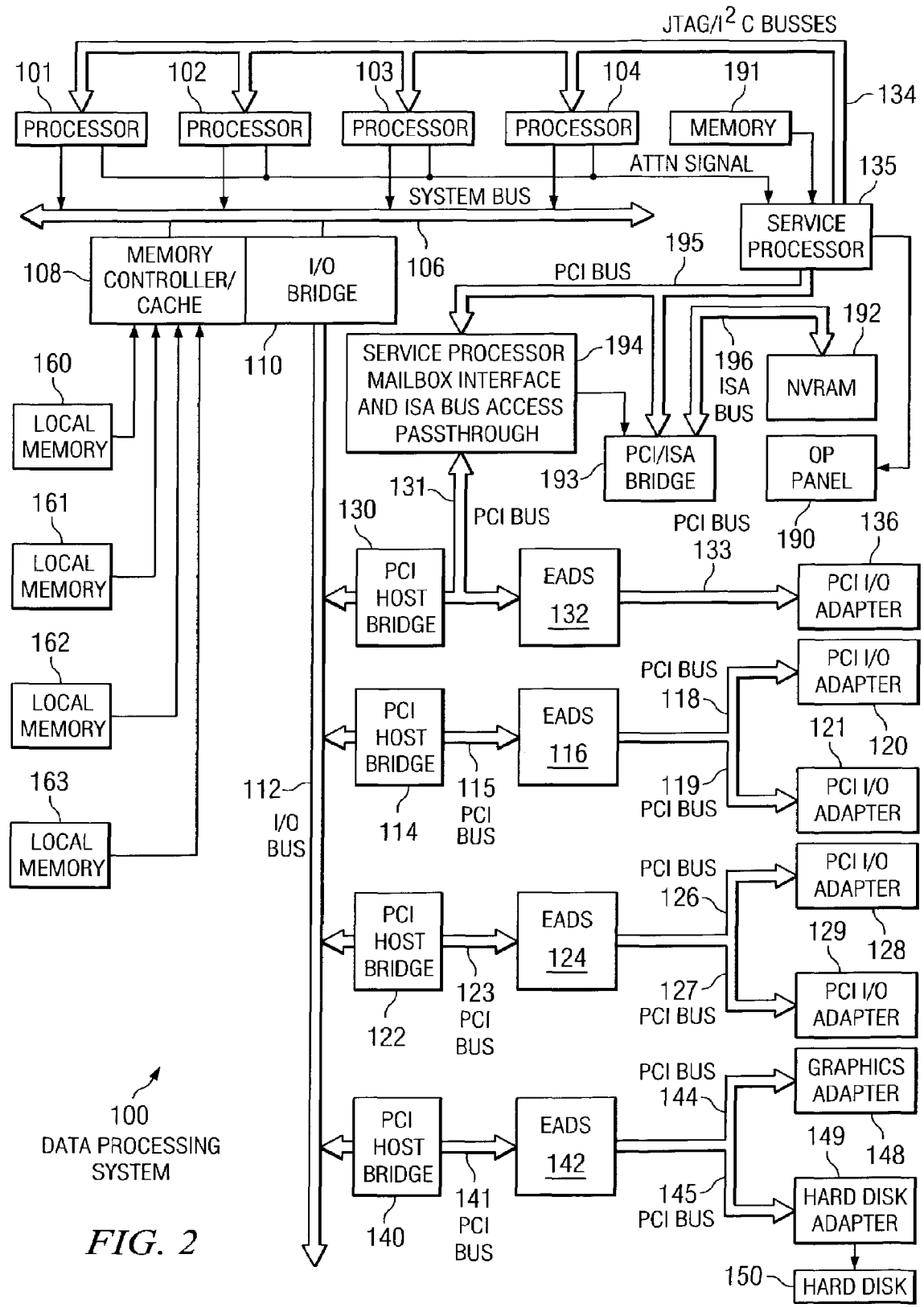
FIG. 2 illustrates a block diagram of a data processing system in which the present invention may be implemented in accordance with the present invention.

FIG. 2 illustrates a block diagram of a data processing system in which the present invention may be implemented in accordance with the present invention. Data processing system 100 includes a plurality of processors 101, 102, 103, and 104 connected to system bus 106. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within in it. Data processing system 100 is logically partitioned such that different I/O adapters 120–121, 128–129, 136, and 148–149 may be assigned to different logical partitions.

Thus, for example, suppose data processing system 100 is divided into three logical partitions, P1, P2, and P3. Each of I/O adapters 120–121, 128–129, 136, and 148–149, each of processors 101–104, and each of local memories 160–164 is assigned to one of the three partitions. For example, processor 101, memory 160, and I/O adapters 120, 128, and 129 may be assigned to logical partition P1; processors 102–103, memory 161, and I/O adapters 121 and 136 may be assigned to partition P2; and processor 104, memories 162–163, and I/O adapters 148–149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000 operating system may be operating within logical partition P1. Windows 2000 is a product and trademark of Microsoft Corporation of Redmond, Wash.

Peripheral component interconnect (PCI) Host bridge 114 connected to I/O bus 112 provides an interface to PCI local bus 115. A number of Input/Output adapters 120–121 may be connected to PCI bus 115. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 122 provide an interface for an additional PCI bus 123. PCI bus 123 is connected to a plurality of PCI I/O adapters 128–129 by a PCI bus 126–127. Thus, additional I/O devices, such as, for example, modems or network adapters may be supported through each of PCI I/O adapters 128–129. In this manner, data processing system 100 allows connections to multiple network computers.

A memory mapped graphics adapter 148 may be connected to I/O bus 112 through PCI Host Bridge 140 and EADS 142 (PCI-PCI bridge) via PCI buses 141 and 144 as depicted. Also, a hard disk 150 may also be connected to I/O bus 112 through PCI Host Bridge 140 and EADS 142 via PCI buses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access pass-through logic 194 and EADS 132. The ISA bus access pass-through logic 194 forwards PCI accesses destined to the PCI/ISA bridge 193. The NVRAM storage 192 is connected to the ISA bus 196. The service processor 135 is coupled to the service processor mailbox interface 194 through its local PCI bus 195. Service processor 135 is also connected to processors 101–104 via a plurality of JTAG/I²C buses 134. JTAG/I²C buses 134 are a combination of JTAG/scan busses (see IEEE 1149.1) and Phillips I²C busses. However, alternatively, JTAG/I²C buses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

When data processing system 100 is initially powered up, service processor 135 uses the JTAG/scan buses 134 to interrogate the system (Host) processors 101–104, memory controller 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101–104, memory controller 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTS, BATS, and memory tests, then data processing system 100 is allowed to proceed to load executable code into local (Host) memories 160–163. Service processor 135 then releases the Host processors 101–104 for execution of the code loaded into Host memory 160–163 while the Host processors 101–104 are executing code from respective operating systems within the data processing system 100, service processor 135 enters a mode of monitoring and reporting errors. The type of items monitored by service processor include, for example, the cooling fan speed and operation, thermal sensors, power supply regulators, and recoverable and non-recoverable errors reported by processors 101–104, memories 160–163, and bus-bridge controller 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
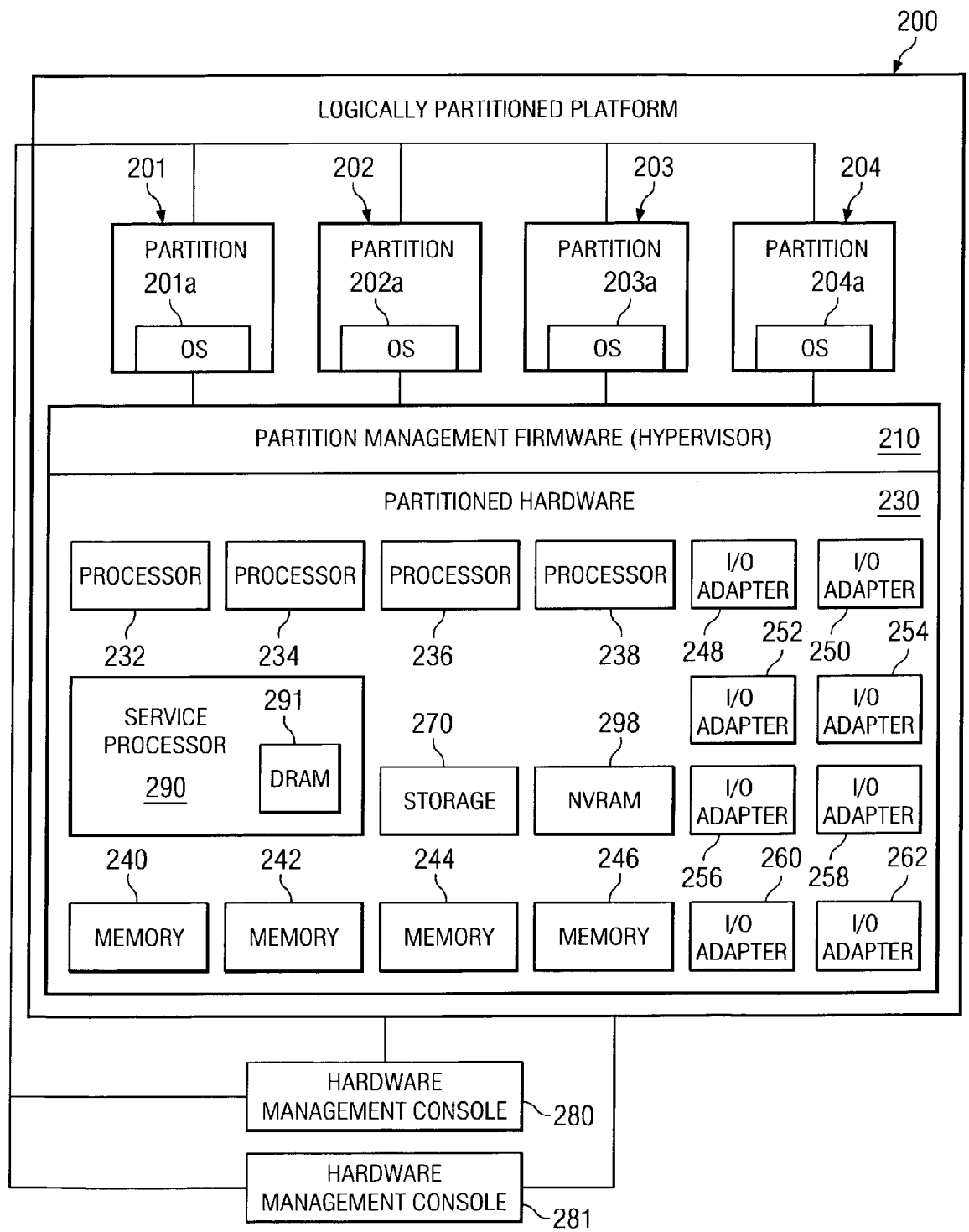
FIG. 3 depicts a block diagram of a logically partitioned platform in accordance with the present invention.

FIG. 3 illustrates a block diagram of a logically partitioned platform in accordance with the present invention. Logically partitioned platform 200 includes partitioned hardware (also called the base hardware) 230, partition management firmware, also called a hypervisor 210, and partitions 201–204. Operating systems 201a–204a exist within partitions 201–204. Operating systems 201a–204a may be multiple copies of a single operating system or multiple heterogeneous operating systems simultaneously run on platform 200.

Each partition may be located in different geographical areas from the other partitions. The partitions may also be located in areas that are different from the geographical area where each HMC is located. As an example, partition 201 may be physically located in England, partition 202 physically located in France, partition 203 physically located in Spain, partition 204 in China, while HMC 280 is physically located in Japan, and HMC 281 is physically located in German.

Partitioned hardware 230 includes a plurality of processors 232–238, a plurality of system memory units 240–246, a plurality of input/output (I/O) adapters 248–262, and a storage unit 270. Each of the processors 242–248, memory units 240–246, NVRAM storage 298, and I/O adapters 248–262 may be assigned to one of multiple partitions 201–204.

Partitioned hardware 230 also includes service processor 290. A non-volatile memory device 291, such as a DRAM device, is included within service processor 291. The partition tables and firmware images described herein, as well as other information, are stored within service processor memory 291.

Partition management firmware (hypervisor) 210 performs a number of functions and services for partitions 201–203 to create and enforce the partitioning of logically partitioned platform 200. Hypervisor 210 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 201a–204a by virtualizing all the hardware resources of logically partitioned platform 200. Hypervisor 210 may attach I/O devices through I/O adapters 248–262 to single virtual machines in an exclusive mode for use by one of OS images 201a–204a.

A hardware management console (HMC) 280 may be coupled to data processing system 100 which includes logically partitioned platform 200. HMC 280 is a separate computer system that is coupled to logically partitioned platform 200 and may be used by a user to control various functions of data processing system 100. HMC 280 includes a graphical user interface (GUI) which may be used by a user to select a partition to be rebooted. A redundant system, HMC 281, may also be included where HMC 281 is coupled to each partition 201–204 and which functions as does HMC 280.

Hardware management console (HMC) 280, 281 manages the various partitions, partitioned hardware, software execution, as well as performs other management functions such as error handling. When errors occur within one of the partitions, the operating system of the partition reports the error to both HMCs 280 and 281. Each HMC 280 and 281 then displays the error on a display that included as part of HMC 280 and 281.

The Partition Manager is a component of Hypervisor 210 which specifically handles the instantiation and termination of partitions. During instantiation, the partition manager allocates resources to the starting partitions. During termination, the partition manager reclaims resources from the terminating partitions.

Figures 4, 5:
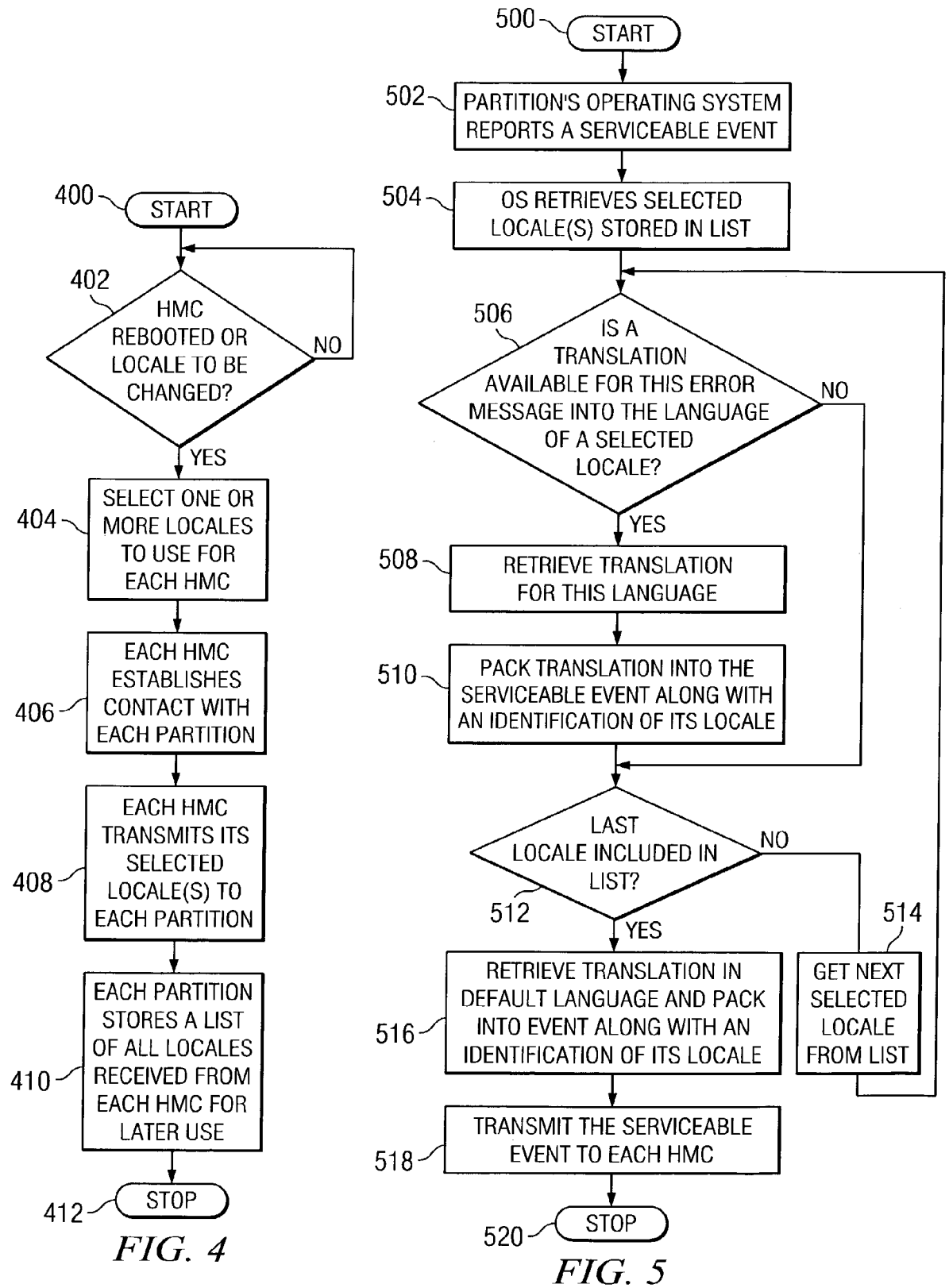
FIG. 4 illustrates a high level flow chart which depicts a selection of one or more locales for each hardware management console in accordance with the present invention.
FIG. 5 depicts a high level flow chart which illustrates a partition storing, within a serviceable event, translations of a message into languages selected by a hardware management console in accordance with the present invention.

FIG. 4 illustrates a high level flow chart which depicts a selection of one or more locales for each hardware management console in accordance with the present invention. The process starts as depicted by block 400 and thereafter passes to block 402 which illustrates a determination of whether or not a hardware management console (HMC) has been rebooted or a locale is to be changed within the HMC. If a determination is made that no HMC has been rebooted or requires its locale to be changed, the process passes back to block 402. Referring again to block 402, if a determination is made that either an HMC has been rebooted or its locale is to be changed, the process passes to block 404. Block 404 depicts selecting one or more locales to use for each HMC. An HMC may select the locale of its geographical location, or it may select any other locale. Although an HMC will typically select only one locale, and thus receive error messages in only one language, an HMC may select multiple locales and receive error messages in the languages of each of those locales. The process then passes to block 406 which illustrates each HMC establishing contact with each partition. Block 408, then, depicts each HMC transmitting its selected one or more locales to each partition. Thereafter, block 410 illustrates each partition storing a list of all locales received from each HMC for later use. The process then terminates as illustrated by block 412.

FIG. 5 depicts a high level flow chart which illustrates a partition storing, within a serviceable event, translations of a message into languages selected by a hardware management console in accordance with the present invention. The process starts as depicted by block 500 and thereafter passes to block 502 which illustrates a partition's operating system reporting a message, such as a serviceable event that includes an error message. Next, block 504 depicts the operating system retrieving the locales that the partition had previously stored in a list of locales specified by all of the hardware management consoles.

Block 506, then, illustrates a determination of whether or not a translation is available for this error message into the language of a selected locale. If a determination is made that a translation is available, the process passes to block 508 which depicts retrieving the translation for this language. Next, block 510 illustrates packing this translation, along with an identification of its locale, into the serviceable event. Thereafter, the process passes to block 512. Referring again to block 506, if a determination is made that a translation is not available, the process passes to block 512.

Block 512 illustrates a determination of whether or not this is the last locale included in the list. If a determination is made that this is not the last locale in the list, the process passes to block 514 which depicts getting the next selected locale from the list. The process then passes back to block 506.

Referring again to block 512, if a determination is made that this is the last locale included in the list, the process passes to block 516 which illustrates retrieving the translation in a default language and packing that translation, along with an identification of the locale of the default language, into the serviceable event. Thereafter, block 518 depicts transmitting the serviceable event to each HMC. The process then passes to block 520.

Figure 6:
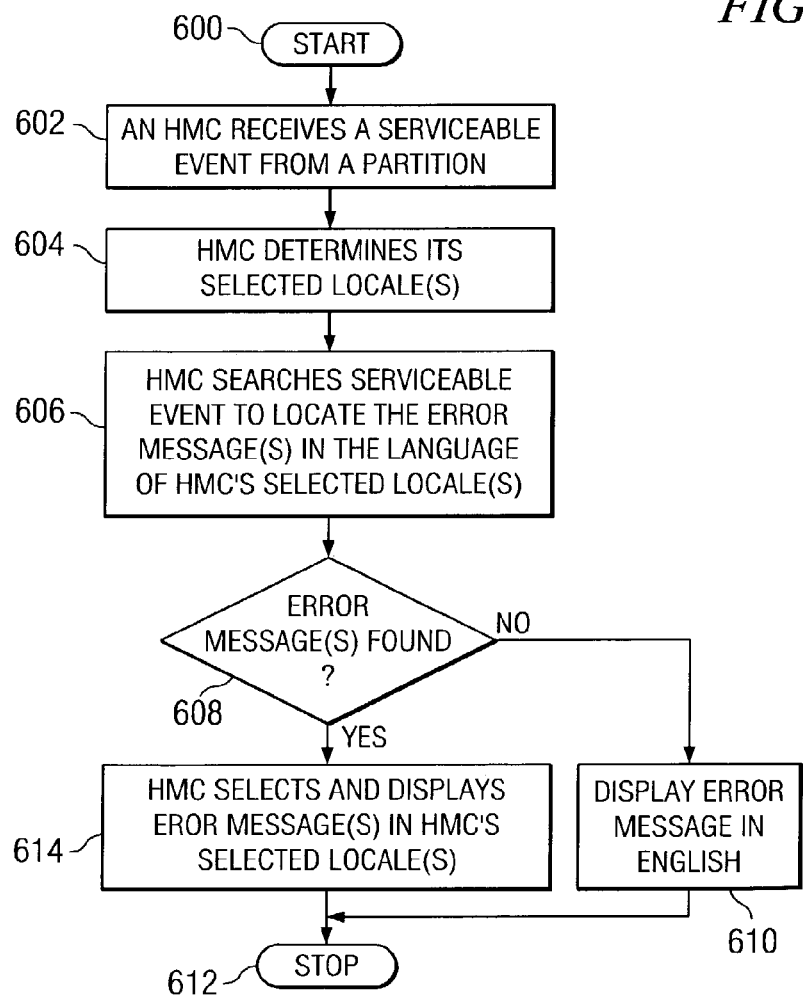
FIG. 6 illustrates a high level flow chart which depicts a hardware management console receiving a serviceable event and retrieving translated messages that are in languages selected by the console in accordance with the present invention.

FIG. 6 illustrates a high level flow chart which depicts a hardware management console receiving a serviceable event and retrieving from the event the translated messages that are in languages selected by the console in accordance with the present invention. The process starts as depicted by block 600 and thereafter passes to block 602 which illustrates an HMC receiving a serviceable event from a partition. Next, block 604 depicts the HMC determining the HMC's selected one or more locales. The process then passes to block 606 which illustrates the HMC searching the serviceable event to locate the error message(s) in the language(s) of the HMC's selected locale(s).

Block 608, then, depicts a determination of whether or not an error message in the language(s) of the selected locale(s) is found in the serviceable event. If a determination is made that an error message in the language(s) of the selected locale(s) is not found in the serviceable event, the process passes to block 610 which illustrates the HMC displaying the error message in a default language, such as English. The process then terminates as depicted by block 612.

Referring again to block 608, if a determination is made that error messages are found in the serviceable event in the language(s) of the selected locale(s), the process passes to block 614 which depicts the HMC selecting and displaying the error message(s) in the language(s) of the HMC's selected locale(s). The process then terminates as depicted by block 612.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a logically partitioned data processing system that includes a plurality of partitions and a management console for displaying messages in a language specified by said console, said method comprising the steps of:
   specifying, by said management console, a locale wherein said management console is located;
   specifying said language by said management console, said language being specified by said management console specifying said locale, further wherein said language is a language that is native to said locale;
   transmitting said specification of said language to each one of said plurality of partitions;
   generating a message within one of said plurality of partitions;
   utilizing, by said one of said plurality of partitions, said specification of said language to select a translation of said message into said language;
   transmitting said translation from said one of said plurality of partitions to said management console; and
   displaying by said management console said message in said language.

2. The method according to claim 1, further comprising the steps of:
   receiving within each one of said plurality of partitions said specification of said locale; and
   utilizing, by said one of said plurality of partitions, said specification of said locale to select a translation of said message into said language.

3. The method according to claim 1, further comprising the steps of:
   transmitting said translation and an identification of said locale to said management console.

4. The method according to claim 1, further comprising the steps of:
   specifying, by said management console, a locale wherein said management console is located;
   said language being specified by said management console by said management console specifying said locale, further wherein said language is a language that is native to said locale;
   receiving within each one of said plurality of partitions said specification of said locale;
   generating within one of said plurality of partitions a serviceable event, said serviceable event including an error message;
   utilizing said locale to select a translation of said error message into said language;
   including, by said one of said plurality of partitions, said translation and an identification of said locale in said serviceable event; and
   transmitting said serviceable event including said translation and said identification of said locale to said management console.

5. The method according to claim 1, wherein each one of said plurality of partitions is located in a different geographical locale, wherein a different language is native to each one of said different geographical locales.

6. The method according to claim 1, further comprising the steps of:
   including a second management console in said logically partitioned data processing system; and said management console being located in a first locale wherein a first language is native to said first locale, and said second management console being located in a second locale wherein a second language is native to said second locale.

7. The method according to claim 6, further comprising the steps of:
specifying, by said management console, said first locale wherein said management console is located;
specifying, by said second management console, said second locale wherein said second management console is located;
receiving within each one of said plurality of partitions said specification of said first locale and said specification of said second locale;
generating within one of said plurality of partitions a serviceable event, said serviceable event including an error message;
utilizing said first locale to select a translation of said error message into said first language;
utilizing said second locale to select a translation of said error message into said second language;
including, by said one of said plurality of partitions, said translation of said error message into said first language and an identification of said first locale in said serviceable event, said identification of said first locale being associated with said translation into said first language;
including, by said one of said plurality of partitions, said translation of said error message into said second language and an identification of said second locale in said serviceable event, said identification of said second locale being associated with said translation into said second language; and
transmitting, to said management console and to said second management console, said serviceable event including said translation into said first language and said identification of said first locale and said translation into said second language and said identification of said second locale.

8. The method according to claim 1, further comprising the steps of:
receiving within said management console an event that includes a plurality of translations of a message into different languages;
determining a locale wherein said management console is located, said language being native to said locale; and
selecting, by said management console, one of said plurality of translations into said language that is native to said locale.

9. A logically partitioned data processing system that includes a plurality of partitions and a management console for displaying messages in a language specified by said console, said system comprising:
said management console specifying a locale wherein said management console is located;
said management console for specifying said language, said language being specified by said management console specifying said locale, further wherein said language is a language that is native to said locale;
translating means for transmitting said specification of said language to each one of said plurality of partitions;
generating means for generating a message within one of said plurality of partitions;
said one of said plurality of partitions utilizing said specification of said language to select a translation of said message into said language;
said one of said plurality of partitions transmitting said translation from said one of said plurality of partitions to said management console; and
said management console displaying said message in said language.

10. The system according to claim 9, further comprising:
each one of said plurality of partitions for receiving said specification of said locale; and
said one of said plurality of partitions utilizing said specification of said locale to select a translation of said message into said language.

11. The system according to claim 9, further comprising:
said translation and an identification of said locale being transmitted to said management console.

12. The system according to claim 9, further comprising:
said management console specifying a locale wherein said management console is located;
said language being specified by said management console by said management console specifying said locale, further wherein said language is a language that is native to said locale;
each one of said plurality of partitions for receiving said specification of said locale;
one of said plurality of partitions for generating a serviceable event, said serviceable event including an error message;
said locale being utilized to select a translation of said error message into said language;
said one of said plurality of partitions for including said translation and an identification of said locale in said serviceable event; and
said serviceable event including said translation and said identification of said locale being transmitted to said management console.

13. The system according to claim 9, wherein each one of said plurality of partitions is located in a different geographical locale, wherein a different language is native to each one of said different geographical locales.

14. The system according to claim 9, further comprising:
a second management console being included in said logically partitioned data processing system; and
said management console being located in a first locale wherein a first language is native to said first locale, and said second management console being located in a second locale wherein a second language is native to said second locale.

15. The system according to claim 14, further comprising:
said management console for specifying said first locale wherein said management console is located;
said second management console for specifying said second locale wherein said second management console is located;
each one of said plurality of partitions for receiving said specification of said first locale and said specification of said second locale;
one of said plurality of partitions for generating a serviceable event, said serviceable event including an error message;
said first locale being utilized to select a translation of said error message into said first language;
said second locale being utilized to select a translation of said error message into said second language;
said one of said plurality of partitions for including said translation of said error message into said first language and an identification of said first locale in said serviceable event, said identification of said first locale being associated with said translation into said first language;

said one of said plurality of partitions for including said translation of said error message into said second language and an identification of said second locale in said serviceable event, said identification of said second locale being associated with said translation into said second language; and said serviceable event including said translation into said first language and said identification of said first locale and said translation into said second language and said identification of said second locale being transmitted to said first and said second management consoles.

16. The system according to claim 9, further comprising:

said management console for receiving an event that includes a plurality of translations of a message into different languages;

determining means for determining a locale wherein said management console is located, said language being native to said locale; and said management console for selecting one of said plurality of translations into said language that is native to said locale.

17. A recordable type computer program product having recorded thereon program code that is executable by a logically partitioned data processing system that includes a plurality of partitions and a management console for displaying messages in a language specified by said console, said product comprising:

instruction means for specifying, by said management console, a locale wherein said management console is located:

instruction means for specifying said language by said management console, said language being specified by said management console specifying said locale, further wherein said language is a language that is native to said locale;

instruction means for transmitting said specification of said language to each one of said plurality of partitions;

instruction means for generating a message within one of said plurality of partitions;

instruction means for utilizing, by said one of said plurality of partitions, said specification of said language to select a translation of said message into said language;

instruction means for transmitting said translation from said one of said plurality of partitions to said management console; and instruction means for displaying by said management console said message in said language.

18. The product according to claim 17, further comprising:

instruction means for receiving within each one of said plurality of partitions said specification of said locale; and instruction means for utilizing, by said one of said plurality of partitions, said specification of said locale to select a translation of said message into said language.

19. The product according to claim 17, further comprising:

instruction means for transmitting said translation and an identification of said locale to said management console.

20. The product according to claim 17, further comprising:

instruction means for specifying, by said management console, a locale wherein said management console is located;

said language being specified by said management console by said management console specifying said locale, further wherein said language is a language that is native to said locale;

instruction means for receiving within each one of said plurality of partitions said specification of said locale;

instruction means for generating within one of said plurality of partitions a serviceable event, said serviceable event including an error message;

instruction means for utilizing said locale to select a translation of said error message into said language;

instruction means for including, by said one of said plurality of partitions, said translation and an identification of said locale in said serviceable event; and instruction means for transmitting said serviceable event including said translation and said identification of said locale to said management console.

21. The product according to claim 17, wherein each one of said plurality of partitions is located in a different geographical locale, wherein a different language is native to each one of said different geographical locales.

22. The product according to claim 17, further comprising:

instruction means for including a second management console in said logically partitioned data processing system; and said management console being located in a first locale wherein a first language is native to said first locale, and said second management console being located in a second locale wherein a second language is native to said second locale.

23. The product according to claim 22, further comprising:

instruction means for specifying, by said second management console, said second locale wherein said management console is located;

instruction means for specifying, by said second management console, said second locale wherein said second management console is located;

instruction means for receiving within each one of said plurality of partitions said specification of said first locale and said specification of said second locale;

instruction means for generating within one of said plurality of partitions a serviceable event, said serviceable event including an error message;

instruction means for utilizing said first locale to select a translation of said error message into said first language;

instruction means for utilizing said second locale to select a translation of said error message into said second language;

instruction means for including, by said one of said plurality of partitions, said translation of said error message into said first language and an identification of said first locale in said serviceable event, said identification of said first locale being associated with said translation into said first language;

instruction means for including, by said one of said plurality of partitions, said translation of said error message into said second language and an identification of said second locale in said serviceable event, said identification of said second locale being associated with said translation into said second language; and instruction means for transmitting, to said management console and to said second management console, said serviceable event including said translation into said first language and said identification of said first locale and said translation into said second language and said identification of said second locale.

24. The product according to claim 17, further comprising:

instruction means for receiving within said management console an event that includes a plurality of translations of a message into different languages;

instruction means for determining a locale wherein said management console is located, said language being native to said locale; and instruction means for selecting, by said management console, one of said plurality of translations into said language that is native to said locale.

* * * * *